United States Patent [19]

Jacobson et al.

[11] Patent Number: 4,482,170

[45] Date of Patent: Nov. 13, 1984

[54] GAS RISER APPARATUS

[75] Inventors: Irvin D. Jacobson, Bratenahl; Frank R. Volgstadt; Carl E. Passerell, both of Madison, all of Ohio

[73] Assignee: Perfection Corporation, Medina, Ohio

[21] Appl. No.: 279,617

[22] Filed: Jul. 1, 1981

[51] Int. Cl.³ .............................................. F16L 9/14
[52] U.S. Cl. ..................................... 285/55; 285/105; 285/174; 285/256; 285/DIG. 6
[58] Field of Search ...................... 285/256, 55, 15, 40, 285/174, DIG. 6, 105

[56] References Cited

U.S. PATENT DOCUMENTS

| | | | |
|---|---|---|---|
| 635,636 | 10/1899 | Bailey | 285/40 |
| 1,924,712 | 8/1933 | Eisenman | 285/256 |
| 4,005,880 | 2/1977 | Anderson et al. | 285/47 |
| 4,083,583 | 4/1978 | Volgstadt et al. | 285/55 |
| 4,229,025 | 10/1980 | Volgstadt et al. | 285/286 X |
| 4,284,297 | 8/1981 | Godkin | 285/55 |

FOREIGN PATENT DOCUMENTS 1495499  9/1967  France ................. 285/256

Primary Examiner—Thomas F. Callaghan
Attorney, Agent, or Firm—Fay & Sharpe

[57] ABSTRACT

The gas riser connects underground natural gas service lines, particularly plastic service lines, with above ground meters and the like. The riser includes a conduit or plastic tube which has first and second ends. An annular collar is swaged onto the exterior of the conduit adjacent its first end. An annular resilient seal frictionally engages the exterior of the conduit abutting the annular collar. A retaining ring is slidably disposed on the exterior of the conduit abutting the resilient seal. A connector is integrally affixed to the second end of the conduit for connecting it to a service line. A tubular element or iron pipe has an internal bore, an annular projection into the internal bore, a tapered portion adjacent the projection, and threads at one end for connecting it with the meter. The first end of the conduit is disposed in the internal bore with the retaining ring engaging the annular projection, the resilient seal engaging the tapered portion, and the annular collar pressed into engagement with the tapered portion and compressing the resilient seal against the retaining ring, the O.D. of the conduit and the I.D. of the iron pipe.

16 Claims, 5 Drawing Figures

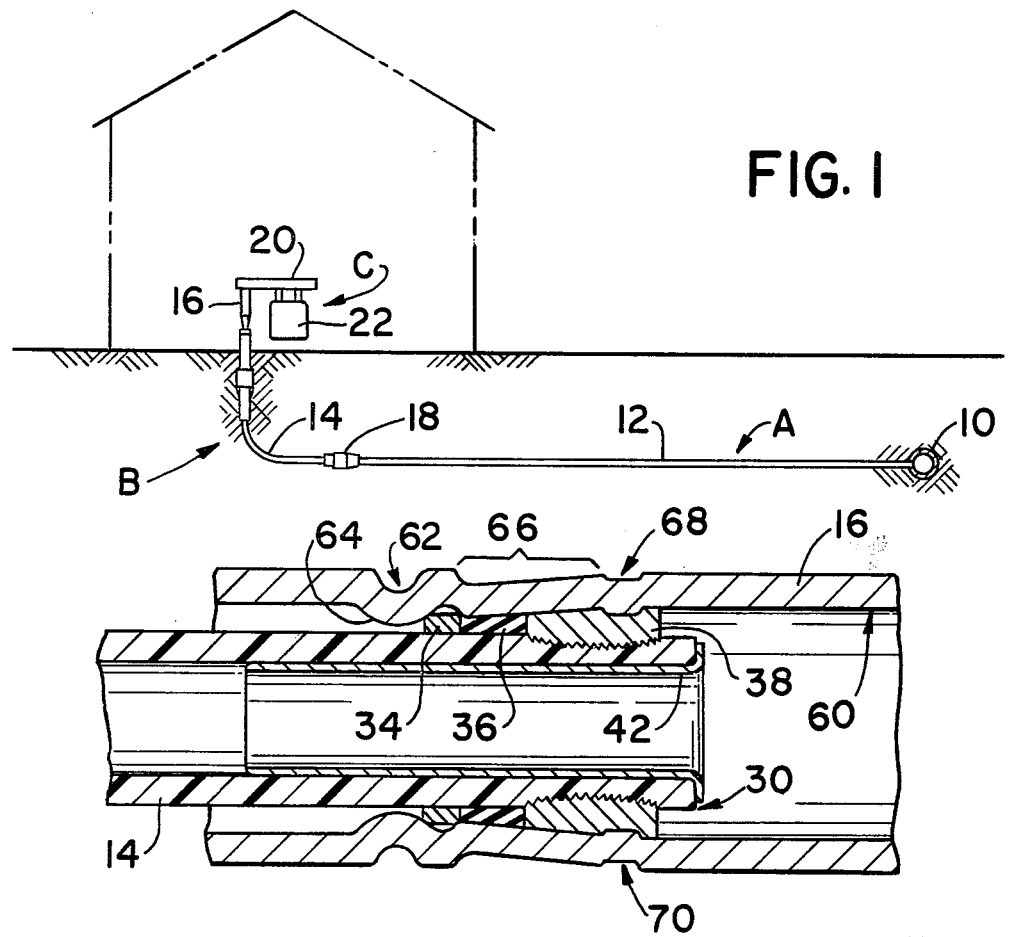
FIG. 1
FIG. 3
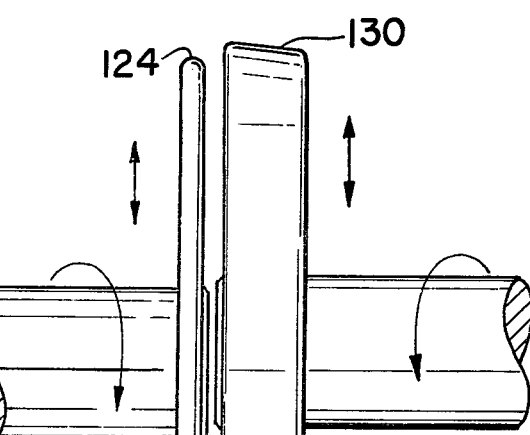
FIG. 5
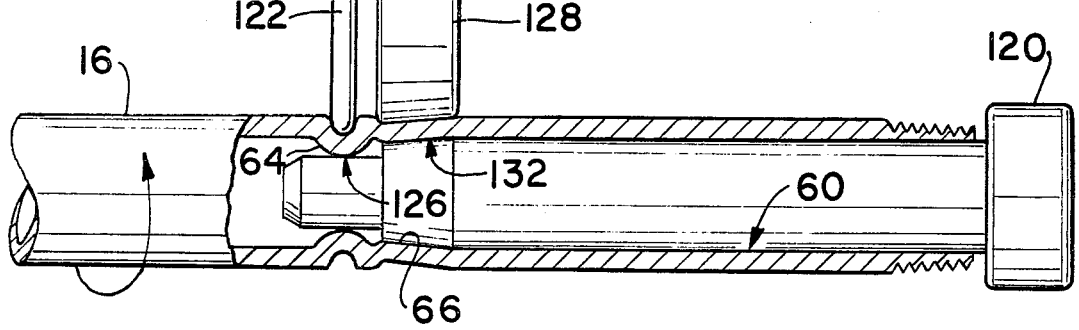

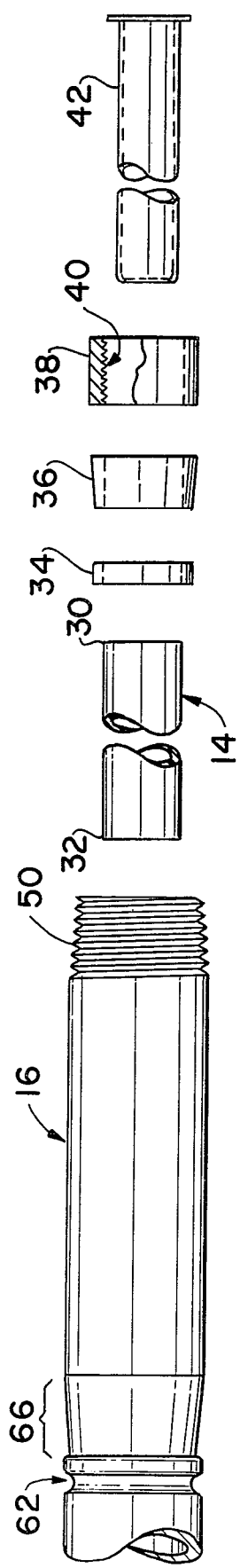
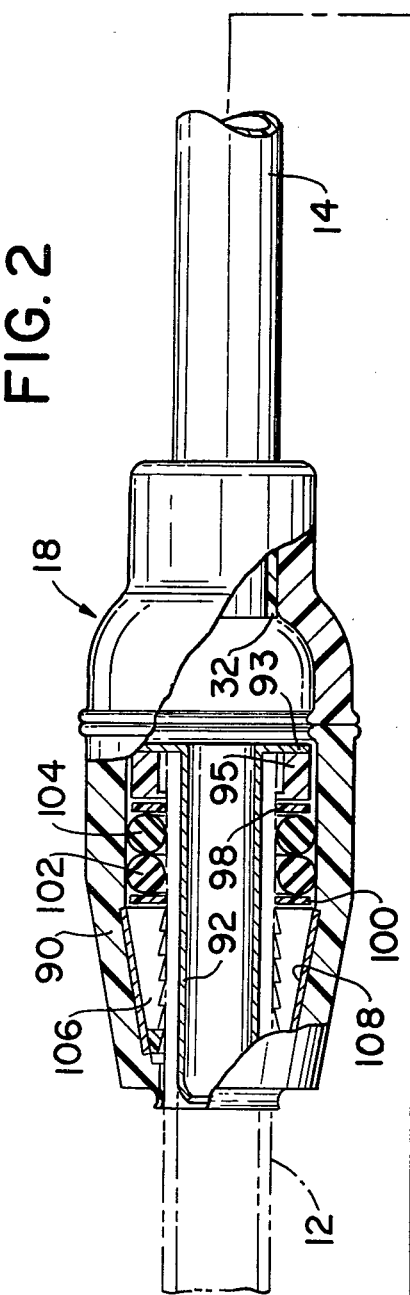
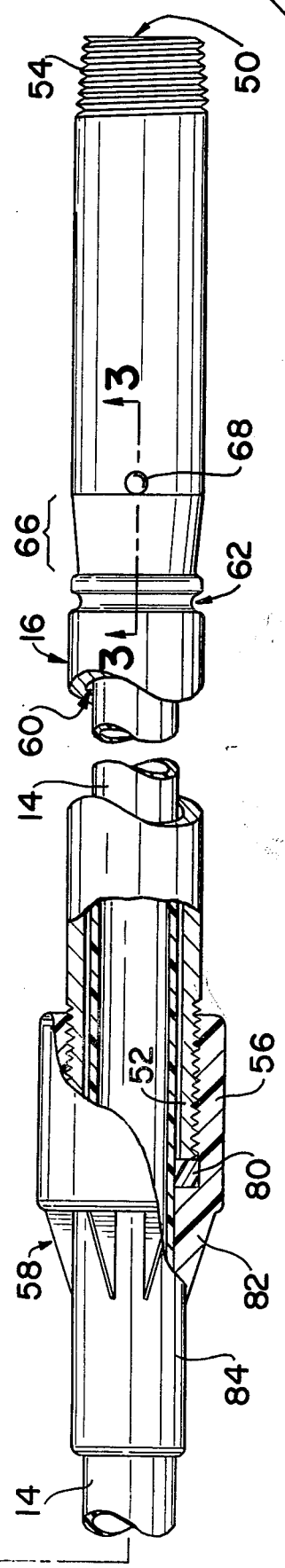
FIG. 2
FIG. 4

GAS RISER APPARATUS

BACKGROUND OF THE INVENTION

This application pertains to the art of pressurized fluid conduction. More particularly, the invention relates to connecting above ground and below ground conduits through which pressurized fluids are conducted. The invention is particularly applicable to risers for connecting below ground natural gas service lines above ground with meters and other fluid receiving members. It will be appreciated, however, that the invention has other applications including channelling other subterranean utilities such as water, electric power or telephone lines, fuel oil, and the like above ground.

Historically, natural gas has been conveyed in heavy iron and steel pipes. These heavy pipes were relatively short, on the order of 8 to 20 feet, and required frequent connections. More recently lighter weight and more corrosion resistant conduits have been replacing the iron pipe. Continuous length tubing, i.e., tubing that is sold in reels of 50 feet, 100 feet, or longer, greatly reduce the amount of labor for installation. For service lines, plastic tubing in continuous lengths from reels is perhaps the most common, although conduits of copper, aluminum, plastic and metallic composites, and the like are also common. The plastic and other conduits, particularly tubing which is sufficiently flexible to be sold on reels, lack the impact, fracture, cutting and abrasion resistance of iron and steel pipe. They tend to fail prematurely at elevated temperatures and tend to become brittle at low temperatures. This increases the danger of the conduit losing its gas conducting integrity when impacted by a lawnmower, gardening tool, snow shovel, or the like. Accordingly, many building codes require an impact resistant riser, frequently specifying iron or steel, where a natural gas conduit leaves the ground and enters the meter or building.

The change in conduit construction as it emerges from the ground necessitates a gas impermeable seal between the conduit and impact resistant riser. Most commonly a gas impermeable connection is between plastic and steel. The gas impermeable connection must maintain its integrity under temperature extremes, under impacts, under stresses exerted by different coefficients of expansion, rough handling by installers, and the like. To assure the integrity of the connection, elaborate or redundant multiple seals are commonly used. The forming of multiple connections and seals increases the cost of risers without, necessarily, improving their reliability. Examples of multiple seal interconnections between plastic or other conduit and a steel riser are shown in U.S. Pat. No. 4,085,950, issued Apr. 25, 1978 to Sam Alewitz.

The present invention contemplates a new and improved riser apparatus and method of manufacture which overcomes all of the above-referenced problems and others. It provides a riser which is simple and economical to manufacture, yet securely connects plastic or other conduits with a steel or other high strength riser.

SUMMARY OF THE PRESENT INVENTION

In accordance with the present invention, there is provided a riser for connecting service lines, such as plastic service lines, disposed below ground level with a receiving member, such as the manifold of a gas meter, disposed above ground level. The riser includes a high strength tubular element having a first end which is adapted to be disposed above ground level, a second end which is adapted to be disposed below ground level, and an internal bore extending between the first and second ends. A conduit for conducting the natural gas has a first end and a second end. The conduit extends through the second end of the tubular element with its first end disposed within the internal bore of the tubular element. The second end of the conduit is adapted to be connected with a service line. An annular collar frictionally engages the conduit adjacent its first end and frictionally engages the internal bore of the tubular element to lock the conduit and the tubular element against relative movement. An annular seal disposed adjacent the annular collar frictionally engages the conduit and the internal bore of the tubular element. The annular seal prevents gas from flowing between the conduit and the tubular element below the seal. In this manner, natural gas from the service line may be conducted from the second to the first end of the conduit, through the portion of the internal bore of the tubular element which is above the annular seal to the first end of the tubular element and the receiving member.

A principal advantage of the present invention is that it provides an effective, gas impermeable connection between inner and outer conduits of a riser.

Another advantage of the present invention is that it is relatively simple to manufacture, yet provides a strong, gas impermeable connection even under extreme temperature, loading, and impact conditions.

BRIEF DESCRIPTION OF THE DRAWINGS

The present invention may take form in various parts and arrangements of parts. The drawings are for the purposes of illustrating a preferred embodiment of the invention in detail only and should not be construed as limiting the invention.

FIG. 1 illustrates a typical installation of a riser in accordance with the present invention;

FIG. 2 is an exploded view of a riser in accordance with the present invention;

FIG. 3 is a side sectional view of a gas impermeable seal and connection between the inner and outer conduits of a riser in accordance with the present invention;

FIG. 4 is a side plan view in partial section of a riser in accordance with the present invention; and FIG. 5 is illustrative of a method of manufacturing a riser in accordance with the present invention.

DESCRIPTION OF THE PREFERRED EMBODIMENT

Looking to FIG. 1, an underground utility A or the like is connected by a riser or riser apparatus B with an above ground receiving means C. The underground utility includes a main 10 which is connected with a source of natural gas. A service line 12 conducts gas from the main toward a point of usage. The riser B includes an inner gas conducting conduit 14 and a tough outer shield or tubular element 16. The inner conduit 14 is connected with the service line by a connector 18. The tubular element 16 extends from below ground level to an above ground manifold 20 of a gas meter 22. While the meter 22 of FIG. 1 includes a manifold 20, it should be understood that the tubular element 16 may be connected directly to the meter (where the meter is adapted to directly receive the gas line) such as at the bottom thereof. Although the preferred embodiment is described in terms of conducting natural gas, the invention is not so limited. Rather, the invention contemplates conducting other fluids or even electrical power and telephone lines or the like.

In the application of the invention shown in FIG. 1, the riser apparatus B conducts gas from below ground level to the meter above ground level. It should be understood, however, that in the case of farm or remote meter sets gas is conducted out of the ground by using a meter riser through the meter and then back into the ground by again using a meter riser. Thereafter the gas is conducted to the house, back out of the ground means by another riser and through the foundation. In this case, the gas passes through the risers, depending on their location, in both directions. This invention is directed to all applications of risers regardless of the direction of gas flow and regardless of the gas receiving means above ground.

With reference to FIGS. 2 and 3, the inner conduit 14 has a first end 30 and a second end 32. Preferably, the conduit 14 is plastic tubing. However, plastic-aluminum composite tubing, plastic coated steel tubing, copper tubing, aluminum tubing, and the like are also contemplated. A metallic retaining ring 34 is slidingly received on the exterior surface of the conduit 14 adjacent its first end. Abutting the retaining ring 34 is an annular, resilient seal 36. In the preferred embodiment, the resilient seal is a tapered gasket of BUNA-N synthetic rubber. Abutting the resilient seal 36 and adjacent the first end 30 is an annular collar 38 which frictionally engages the exterior surface of the conduit 14. The annular collar 38 is made of material harder than the conduit 14 and has inwardly projecting ridges or threads 40 which deform the exterior of the conduit to increase their frictional engagement. The annular collar 38 is also swaged onto the conduit 14 to increase their frictional engagement still more. In the preferred embodiment, the annular collar 38 is a steel or other metal collar. An internal stiffener 42 is received in the interior of conduit 14 adjacent its first end give it greater radial compressive strength.

Referring to FIGS. 3 and 4, the tubular element 16 has a first end 50 and a second end 52. Threads or other connecting means 54 for connecting the tubular element 16 with the receiving means C are disposed at the first end 50. Threads 56 for connecting the tubular element 16 with a ground water sealing means 58 are disposed at the second end 52. Extending between the first and second ends of the tubular element is an internal bore 60 for receiving the inner conduit 14 concentrically therein.

The tubular element has a stop 62 for engaging the retaining ring 34. The stop 62 includes an annular projection 64 which extends into the internal bore 60 sufficiently to engage the retaining ring 34 but not sufficiently to prohibit the conduit 14 from passing therethrough. An internal tapered portion 66 is defined adjacent the stop 62 towards the first end 50 of the tubular element. The tapered portion 66 is frictionally engaged by the resilient seal 36 to provide a gas impermeable seal therebetween. The annular collar 38 in the preferred embodiment is press fit into firm frictional engagement with the tapered portion 66. This compresses the resilient seal 36 and locks the conduit 14 and the tubular element 16 against relative motion. A pair of inwardly projecting deformations 68 and 70 frictionally engage and deform the annular collar 38 to improve its locking relationship with the tubular element 16.

In alternate embodiments it is not necessary to actually force the collar 38 into engagement with tapered portion 66. Rather, the collar 38 may be retained within tubular element 16 by mechanical staking.

With reference to FIG. 4, the ground water sealing means 58 includes a resilient gasket 80 which is held in frictional engagement with the outer surface of the conduit 14 and the second end 52 of the tubular element 16. A threaded member 82 engages threads 56 to hold the gasket 80 firmly in place. The threaded member 82 has a tail portion 84 with an interior diameter closely conforming to the exterior diameter of the conduit 14.

The connector 18 is a stab-type coupling which is heat fusion weld connected with the second end 32 of the conduit 14. The connector 18 has a coupling body 90 containing a metallic stiffener 92 which has a flange 93 at its internal end. The service line 12, shown in phantom in FIG. 4, is frictionally received on the stiffener until its end abuts the flange. Arranged annularly around the stiffener 92 is an annular retaining spacer ring 95, a pair of thrust washers 98 and 100, a pair of O-rings 102 and 104, and a collet 106. The O-rings 102 and 104 are of sufficient diameter that they frictionally engage and form a gas impermeable seal between the received service line and the body 90 of the connector. The collet 106 is molded of hard plastic and has a plurality of inner teeth which frictionally engage the received service line and a frustro-conical outer wall. The connector body 90 has a frustro-conical surface 108 which interacts with the frustro-conical outer wall of the collet 106. The frustro-conical wall 108 of the connector body is defined by a metal insert for dimensional stability. Under a longitudinally directed uncoupling force, the teeth of the collet frictionally engage the exterior of the service line to inhibit its removal. Additional longitudinal uncoupling force on the service line urges the collet against the frustro-conical surface 108 camming the teeth into greater frictional engagement with the service line. To insure that a longitudinal uncoupling force on the service line cams the collet into greater frictional engagement, with the body, the retaining spacer ring 95 has plastic teeth which embed themselves into the surface of the plastic service line. Under the longitudinally, directed decoupling force, the retaining spacer ring 95 directs a longitudinal force through the thrust washers and the O-rings causing the collet to cam against the frustro-conical surface. A more detailed description of stab-type connectors is found in U.S. Pat. No. 4,229,025, issued Oct. 21, 1980 to F. R. Volgstadt and D. P. Passerell.

With reference to FIG. 5, the tubular element 16 is shaped from black iron pipe. A mandrel 120 is inserted in the internal bore 60 of the tubular element 16. The tubular element is rotated about the mandrel 120 as a rotating grooving wheel 122 moves radially against it. The pressure of the grooving wheel deforms the tubular element to make the annular projection 64. A rounded engaging surface 124 of the grooving wheel determines the shape of annular projection 64. The radial travel of the grooving wheel 122 is limited by a cylindrical end portion 126 of the mandrel 120. A second rotating grooving wheel 128 presses radially against the rotating tubular element 16 to form the tapered portion 66. The second grooving wheel 128 has an angled end surface 130 which matches the taper of the tapered portion 66. Similarly, the mandrel 120 has a tapered surface 132 against which the second grooving wheel 108 presses element 16. The mandrel 120 is held stationary to cause the tapered surface 132 to burnish the tapered portion 66 of the interior bore to make it smooth and uniform. After forming, the exterior of the tubular element is painted or coated with a corrosion resistant material.

To assemble the riser, the retaining ring 34 and the resilient seal 36 are positioned onto the first end 30 of the conduit 14. The stiffener 42 is projected into the interior of the conduit 14. The annular collar 38 is then slipped onto the first end 30. The annular collar 38 is thereafter compressed radially by swaging to improve its frictional engagement with the conduit.

The second end 32 of the conduit 12 is fed through the first end 50 of the tubular element until the retaining ring 34 engages the stop 62 and the annular collar 38 engages the tapered portion 66. A press applies a longitudinal force against the annular collar 38 to increase its frictional engagement with the tapered portion 66. This pressing action also compresses the resilient seal 36 increasing its frictional engagement with the interior bore 60 and with the exterior surface of the conduit 14. To increase the frictional engagement between the annular collar 38 and the tubular element 16, a punch produces deformations 68 and 70 which deform and engage the tubular element and the annular collar 38. The deformations prohibit the first end 30 of the conduit from moving longitudinally toward the first end 50 of the tubular element and from rotating within the internal bore. The compressed resilient seal 36 expands and contracts to compensate for uneven expansion and contraction of the parts with changes in temperature.

The invention has been described with reference to the preferred embodiment. Obviously modifications and alterations will occur to others upon reading and understanding the specification. For example, the placement of the retaining ring 34 and annular collar 38 and the placement of stop 62 and tapered portion 66 can be reversed. The interconnection of the conduit 14 and the tubular member 16 may be disposed closer to the first end 50 or closer to the second end 52 of the tubular element. The tubular element 16 may be bent adjacent its second end such that the conduit 14 extends in a straight line from the riser to the service line. It is our intention to include all these and other modifications and alterations insofar as they come within the scope of the appended claims or the equivalents thereof.

Having thus described the preferred embodiment of our invention, we now claim our invention to be:

1. A pipe joint construction comprising:
    (a). a conduit assembly including:
        a conduit having a first end and a second end;
        an annular collar affixed to the exterior of the conduit adjacent its first end;
        a resilient seal frictionally engaging the exterior surface of the conduit adjacent the annular collar; and,
        a retaining ring slidably disposed on the exterior surface of the conduit with a first side of the retaining ring adjacent the resilient seal;
    (b). a tubular element defining:
        an internal bore in which the first end of the conduit is disposed;
        a stop projecting onto the internal bore, a second side of the retaining ring abutting the stop to prevent movement of the retaining ring therepast, the conduit being slidably received past the stop; and,
        an elongated, frustro-conical tapered portion projecting frustro-conically into the internal bore displaced from the stop, the tapered portion projecting into the bore a greater distance at an end toward the stop projection than at an end away from the stop projection, the conduit being slidably receivable past the tapered portion, the resilient seal engaging the retaining ring and the tapered portion; and,
    (c). means for anchoring the annular collar in a fixed relationship relative to the tubular element, the annular collar abutting the resilient seal, the annular collar and the retaining ring compressing the resilient seal therebetween into continuing abutment with the tapered portion, whereby under uneven thermal elongation and contraction between the conduit and the tubular element, the resilient seal remains compressed as the conduit slides relative to the retaining ring and the tubular element.

2. The pipe joint as set forth in claim 1 wherein said conduit is non-metallic.

3. The pipe joint as set forth in claim 2 wherein said conduit is plastic.

4. The pipe joint as set forth in claim 3 wherein said annular collar is metallic and is affixed to said plastic conduit by swaging.

5. The pipe joint as set forth in claim 4 wherein a tubular metallic stiffener is received within said conduit at said first end.

6. The pipe joint as set forth in claim 1 wherein said tubular element is staked to said annular collar.

7. The pipe joint as set forth in claim 1 wherein said annular collar engages said tapered portion.

8. A riser apparatus for connecting a gas service line disposed below ground level and a gas receiving means disposed above ground level, the riser apparatus comprising:
    a tubular element having an internal bore, a first end which is adapted to be disposed above ground level, and a second end which is adapted to be disposed below ground level, the first end of the tubular element being adapted for connecting the tubular element with the gas receiving means, the tubular element internal bore having a constant cross section from the first end to tapered portion at which tapered portion the cross section contracts along a cam surface, the tubular element being swagged adjacent the tapered portion to define an annular stop which defines a smaller internal cross section than the tapered portion;
    a gas conducting conduit having a first end and a second end, the conduit extending slidably through the second end of the tubular element, the annular stop, and the tapered portion with the first end of the conduit disposed within the constant cross section portion of the internal bore of the tubular element, the second end of the conduit being adapted to be connected with the service line;
    an annular collar engaging the conduit adjacent its first end and having an external cross section which is slidably receivable in the constant cross section portion of the internal bore;
    an annular, resilient gas seal which is slidably receivable in the constant cross section portion of the internal bore of the tubular element and compressed by the tapered portion such that the resilient seal prohibits the flow of gas between the conduit and tubular element below the resilient seal, the resilient seal being disposed adjacent the annular collar;

a retaining ring which slidably receives the conduit therethrough and which has an external cross section which is slidably receivable in the internal bore and which abuts the annular stop to limit sliding receipt, the retaining ring being disposed adjacent the resilient seal such that the retaining ring, resilient seal, and the annular collar are slidably received in the internal bore; and, inward projecting deformations of the tubular element which deformingly engage the annular collar to lock the annular collar and tubular element against relative sliding movement such that the resilient seal is compressed between the annular collar, the tapered portion, and the retaining ring; whereby gas may be conducted through the second and the fist end of the conduit, through the portion of the internal bore of the tubular element above the resilient seal and through the first end of the tubular element.

9. The riser apparatus as set forth in claim 8 wherein the conduit is plastic tubing and the tubular element is metal, whereby the resilient seal and the annular collar form a gas tight plastic to metal transition connection.

10. The riser apparatus as set forth in claim 9 wherein the annular collar is metal and has internally projecting threads which engage and deform the exterior of the plastic tubing.

11. The riser apparatus as set forth in claim 8 wherein the annular collar is swaged onto the plastic tubing.

12. The riser apparatus as set forth in claim 11 further including a metal stiffening tube disposed in the interior of the plastic tubing adjacent its first end.

13. The riser apparatus as set forth in claim 8 further including a ground water sealing means disposed adjacent the second end of the tubular element to inhibit ground water from entering the internal bore.

14. The riser apparatus as set forth in claim 13 wherein the first end of the tubular element is externally threaded and the second end of the tubular element is externally threaded, the ground water sealing means being threadingly received on the second end of the tubular element.

15. The riser apparatus as set forth in claim 8 wherein the second end of the conduit extends beyond the second end of the tubular element and is connected to a connector for coupling the second end of the conduit with the service line.

16. The riser apparatus as set forth in claim 15 wherein the connector comprises a tubular stiffener for being frictionally received in the interior of the service line, an O-ring for forming a gas tight seal between the connector and the exterior of the service line, a collet having teeth for engaging the exterior of the service line and a frustro-conical outer surface for engaging a frustro-conical inner surface of the connector such that attempted withdrawal of the service line causes a camming action between the frustro-conical surfaces that increases the engagement of the collet teeth with the exterior of the service line.

* * * * *